US012590472B2

(12) United States Patent
Bertelli

(10) Patent No.: US 12,590,472 B2
(45) Date of Patent: Mar. 31, 2026

(54) SECURITY SYSTEM AND DEVICES

(71) Applicant: HavenLock Inc., Nashville, TN (US)

(72) Inventor: Alexander Michael Bertelli, Nashville, TN (US)

(73) Assignee: HavenLock, Inc., Nashville, TN (US)

( * ) Notice: Subject to any disclaimer, the term of this patent is extended or adjusted under 35 U.S.C. 154(b) by 0 days.

(21) Appl. No.: 18/589,907

(22) Filed: Feb. 28, 2024

(65) Prior Publication Data

US 2025/0092717 A1      Mar. 20, 2025

Related U.S. Application Data

(60) Provisional application No. 63/538,455, filed on Sep. 14, 2023, provisional application No. 63/538,454, filed on Sep. 14, 2023.

(51) Int. Cl.
| | |
|---|---|
| *E05B 63/14* | (2006.01) |
| *E05B 47/00* | (2006.01) |
| *G01S 17/06* | (2006.01) |
| *G06T 19/00* | (2011.01) |
| *G07C 9/00* | (2020.01) |
| *G07C 9/28* | (2020.01) |
| *G08B 25/10* | (2006.01) |

(52) U.S. Cl.
CPC .......... *E05B 63/14* (2013.01); *E05B 47/0012* (2013.01); *G01S 17/06* (2013.01); *G06T 19/00* (2013.01); *G07C 9/00571* (2013.01); *G07C 9/28* (2020.01); *G08B 25/10* (2013.01); *E05B 2047/0067* (2013.01); *G06T 2200/24* (2013.01)

(58) Field of Classification Search
CPC ................. E05B 63/14; E05B 47/0012; E05B 2047/0067; G07C 9/28; G07C 9/00571; G01S 17/06; G06T 19/00; G06T 2200/24; G08B 25/10
See application file for complete search history.

(56) References Cited

U.S. PATENT DOCUMENTS

| | | | | |
|---|---|---|---|---|
| 11,157,734 | B1* | 10/2021 | Lipchin | ................ G06V 10/809 |
| 11,210,863 | B1* | 12/2021 | Yan | .......................... G06T 19/20 |
| 11,216,643 | B1* | 1/2022 | Madden | ................. G08B 25/10 |
| 2019/0228601 | A1* | 7/2019 | Grzenda | ........... G07C 9/00571 |
| 2020/0265661 | A1* | 8/2020 | Khojastepour | .......... G07C 9/28 |

(Continued)

*Primary Examiner* — Mark A Williams
(74) *Attorney, Agent, or Firm* — Bochner PLLC; Matthew J. May

(57) ABSTRACT

A security system is disclosed herein comprising one or more sensors and a plurality of locking devices linked to a communications network. Each sensor may be configured to detect at least an event and generate an output signal representing the detected event. Each locking device may be configured to selectively restrict movement of a door. Each locking device may include an actuator and a controller associated therewith. Each controller may be configured to receive the output signal from the one or more sensors, process the received output signal to determine an actuator command, provide the actuator command to the actuator of the locking device, and produce an actuator output based on the actuator command. The actuator output may be operable to manipulate the locking device between a locked configuration and an unlocked configuration. In the locked configuration the locking device may resist movement of the door.

28 Claims, 11 Drawing Sheets

(56)  References Cited

U.S. PATENT DOCUMENTS

| | | | |
|---|---|---|---|
| 2021/0074099 A1* | 3/2021 | Caroselli | G06V 10/82 |
| 2022/0028194 A1* | 1/2022 | Grzenda | E05B 67/22 |
| 2022/0067867 A1* | 3/2022 | Greiner | G06Q 10/08 |
| 2022/0392286 A1* | 12/2022 | Elrad | H04W 12/041 |
| 2023/0009940 A1* | 1/2023 | Wong | G07C 9/00563 |
| 2023/0042058 A1* | 2/2023 | N'Guessan | G07C 9/00563 |
| 2023/0386284 A1* | 11/2023 | Smith | G07C 9/28 |
| 2025/0092717 A1* | 3/2025 | Bertelli | E05B 47/0012 |

* cited by examiner 175        180        160

SECURITY SYSTEM AND DEVICES

CROSS-REFERENCES TO RELATED APPLICATIONS

This application claims benefit of U.S. Provisional Patent Application No. 63/538,454, dated Sep. 14, 2023, entitled "Real-Time Monitoring System and Communications Network," and U.S. Provisional Patent Application No. 63/538,455, dated Sep. 14, 2023, entitled "Locking System for Resisting Movement of an Object," which are hereby incorporated by reference in their entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present disclosure relates generally to security systems and devices. More specifically, the present disclosure relates to systems, methods, and devices for monitoring and selectively securing a facility.

Crisis situations have become an unfortunate reality in the modern world. While organizations and groups prepare to face such situations, conventional security systems and locking devices do not provide the level of security and protection needed.

Crisis situations may arise in which a facility, such as a school, hospital, military installation, place of worship, or the like, must be locked down to ensure the safety of those inside. Oftentimes, remaining in a secured room is the safest option for people within the facility. Yet, it can be difficult to coordinate locking down a facility that includes multiple doors, rooms, and corridors. During a crisis situation, it may be desirable to selectively lock certain doors, or to lock all doors simultaneously.

Traditional lock mechanisms for door assemblies, such as deadbolt locks, are used to prevent or resist access to an interior of a location. Traditional deadbolt lock mechanisms are well known in the art. However, deadbolts can often be overcome with no tools and relatively little force. Alternative locking devices for door assemblies exist in the prior art and are operable to resist greater forces than those resisted by a traditional deadbolt. While a plurality of these locking devices may be installed throughout a facility, each locking device is operated independently. Thus, in a crisis situation, such as an active-shooter situation, each locking device must be activated independent of the next.

When the crisis situation is recognized, lockdown instructions are often relayed throughout the facility. At times, it may be difficult to alert the entire facility in a quick, safe, and efficient manner. Once the alert is relayed, individuals are then relied upon to individually lock the doors. Relaying the information and waiting on individuals to act can take precious seconds, if not minutes, that may be critical in a crisis situation.

One issue in the prior art is the amount of time and effort required to manipulate a lock or locking device. In certain situations, it may be desirable to quickly unlock the locking device and egress from a secured room. To open the door, prior art locking devices typically require users to unlock the locking device and further manipulate the door handle. Thus, a user may be required to take multiple actions to egress. In high-stress situations, like an active-shooter situation, users may experience heightened adrenaline that renders them unable to take the actions necessary to unlock the locking device and open the door.

Another issue in the prior art is the lack of information available to first responders when they respond to a crisis situation. First responders often enter locked-down facilities to secure the interior and neutralize any remaining threats. First responders enter the facility with little knowledge regarding the nature of the threat or where it is located. Moreover, first responders may not be familiar with the layout of the facility, further adding to the complexity of the situation. First responders often go door-to-door securing rooms within the facility and thus learning the facility layout on the fly. With individual rooms being locked down, it can be difficult for first responders to identify which rooms are secure and which may contain a threat. This process takes time and places the lives of the first responders at risk.

Therefore, in order to address shortcomings in the prior art, what is needed are improved systems, methods, and devices for monitoring and selectively securing a facility.

BRIEF SUMMARY

In accordance with aspects of the invention, apparatuses, systems, and methods are provided for enabling intrusion detection and prevention at a premises, including a control system therefore and control method.

According to a first aspect of the present disclosure, provided is a security system comprising one or more sensors and a plurality of locking devices. The one or more sensors may be linked to a communications network. Each sensor may be configured to detect at least an event and generate an output signal representing the detected event. The plurality of locking devices may be linked to the communications network. Each locking device may be configured to selectively restrict movement of a door. Each locking device may include an actuator and a controller associated therewith. Each controller may be configured to receive the output signal from the one or more sensors, process the received output signal to determine an actuator command, provide the actuator command to the actuator of the locking device, and produce an actuator output based on the actuator command. The actuator output may be operable to manipulate the locking device between a locked configuration and an unlocked configuration. In the locked configuration the locking device may resist movement of the door.

According to another aspect of the present disclosure, the one or more sensors may include a light detection and ranging (LIDAR) sensor configured to detect at least a position of an objection.

According to another aspect of the present disclosure, a user interface may be generated in response to at least the output signal from the one or more sensors. The user interface may include a virtual representation of at least the detected object.

According to another aspect of the present disclosure, the user interface includes a virtual model of an area detected by the LIDAR sensor.

According to another aspect of the present disclosure, the one or more sensors include a camera configured to detect an image field.

According to another aspect of the present disclosure, a user interface may be generated in response to at least the output signal from the one or more sensors. The user interface may include a virtual representation of at least the detected image field.

According to another aspect of the present disclosure, the user interface may include a virtual model of an area detected by the camera.

According to another aspect of the present disclosure, the one or more sensors may include a motion sensor configured to detect at least motion within a motion sensor field of view. The controller may be configured to manipulate the locking device into the unlocked configuration at least when the motion sensor detects motion.

According to another aspect of the present disclosure, the door includes a door handle operable to selectively unnest the door from a door frame. The motion sensor may be mounted on the door adjacent to the door handle, and the controller configured to manipulate the locking device into the unlocked configuration at least when the motion sensor detects a user actuating the door handle.

According to another aspect of the present disclosure, each of the one or more sensors may be configured to draw power from an associated locking device when a power level of the sensor reaches a threshold level.

According to another aspect of the present disclosure, the plurality of locking devices may be selectively manipulated between the locked configuration and the unlocked configuration simultaneously.

According to another aspect of the present disclosure, the security system may be configured to selectively generate an alert at least in response to the one or more sensors detecting an event.

According to a second aspect of the present disclosure, provided is a method of providing access control using a security system. The security system may have a plurality of locking devices linked to a communications network. Each locking device may be configured to selectively restrict movement of a door. Each locking device may include an actuator and a controller associated therewith. The method may comprise: via a sensor, detecting an event and generating an output signal representing the detected event; via the controller associated each locking device, receiving the output signal from the sensor and processing the received output signal to determine an actuator command; providing the actuator command to an actuator of the locking device; producing an actuator output based on the actuator command; and wherein the actuator output manipulates the locking device between a locked configuration and an unlocked configuration. In the locked configuration the locking device may resist movement of a door.

According to another aspect of the present disclosure, the sensor may include a light detection and ranging (LIDAR) sensor configured to detect at least the position of an object.

According to another aspect of the present disclosure, the method may further comprise, in response to at least the output signal form the sensor, generating a user interface including a virtual representation of at least the detected object.

According to another aspect of the present disclosure, the sensor may include a camera configured to detect an image field.

According to another aspect of the present disclosure, the method may further comprise, in response to at least the output signal from the sensor, generating a user interface including a virtual representation of at least the detected image field.

According to another aspect of the present disclosure, the sensor may include a motion sensor configured to detect at least motion within a motion sensor field of view. The method may further comprise, via the controller, manipulating the locking device into the unlocked configuration at least when the motion sensor detects motion.

According to another aspect of the present disclosure, the method may further comprise manipulating the locking device into the unlocked configuration at least when the motion sensor detects a user actuating a door handle. The motion sensor may be mounted adjacent to the door handle. The door handle may be operable to selectively unnest the door from a door frame.

According to another aspect of the present disclosure, the method may further comprise generating an alert at least in response to the sensor detecting an event.

Numerous other objects, features, and advantages of the present invention will be readily apparent to those skilled in the art upon a reading of the following disclosure when taken in conjunction with the accompanying drawings.

DETAILED DESCRIPTION

Figure 1:
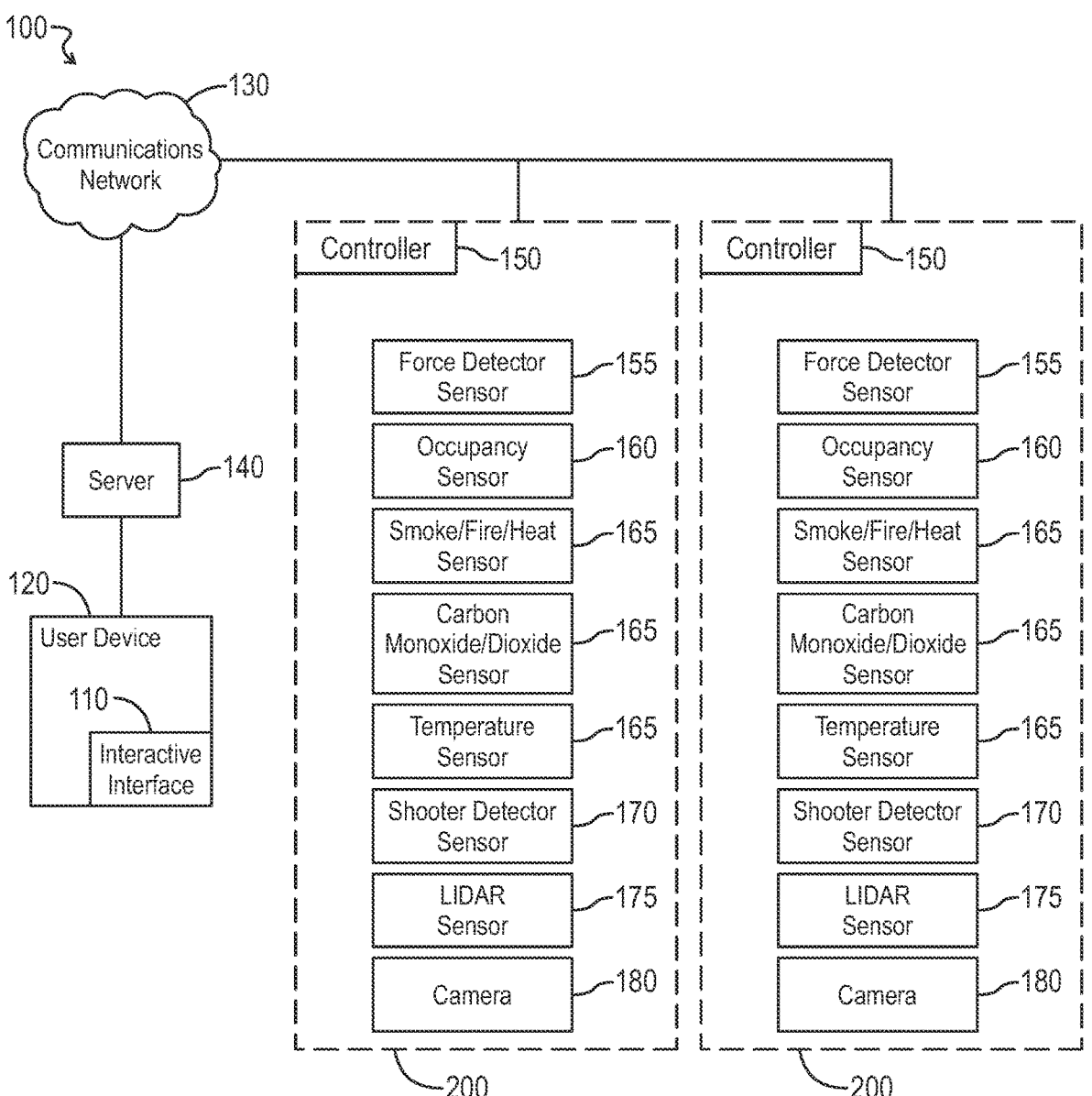
FIG. 1 is a block diagram of a security system.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The words "connected," "attached," "joined," "mounted," "fastened," and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

The term "signal" as used herein may include any meanings as may be understood by those of ordinary skill in the art, including at least an electric or magnetic representation of current, voltage, charge, temperature, data or a state of one or more memory locations as expressed on one or more transmission mediums, and generally capable of being transmitted, received, stored, compared, combined or otherwise manipulated in any equivalent manner.

The term "interactive interface" as used herein may unless otherwise stated include any input-output module with respect to the hosted server including but not limited to web portals, such as individual web pages or those collectively defining a hosted website, mobile applications, desktop applications, telephony interfaces such as interactive voice response (IVR), and the like. Such interfaces may in a broader sense include pop-ups or links to third party websites for the purpose of further accessing and/or integrating associated materials, data or program functions via the hosted system and in accordance with methods of the present invention.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

With reference to FIG. 1, provided is a real-time security system 100 in accordance with exemplary embodiments of the present disclosure. The security system 100 may also be referred to herein as a monitoring system 100. The security system 100 may be configured to operate in association with a facility, such as a school, hospital, military installation, place of worship, or the like, wherein the facility includes a plurality of rooms with corresponding door assemblies providing access thereto. The security system 100 may be configured to monitor and control various devices associated with the facility.

The security system 100 may be configured to generate a "real-time" interactive interface 110. "Real-time" may refer to instantaneous monitoring, but may also refer to substantially instantaneous monitoring. The interactive interface 110 may be displayed on a user device 120, display, or the like. The interactive interface 110 may be operable to monitor and/or control a plurality of devices associated with the security system 100.

Each of the devices associated with the security system 100 may be linked to a communications network 130. The communications network 130 may be associated with a setup location or central hub of the security system 100. The security system 100 may include a server 140 configured to generate the interactive interface 110 for controlling and monitoring the plurality of devices associated the security system 100. The server may be housed within the facility or remotely.

The plurality of devices associated with the security system 100 may include any and all smart devices or otherwise that are capable or may be enabled to connect to and be monitored and/or controlled through the communications network 130. The plurality of devices, when coupled to the server 140, may enable a user to monitor the interior and/or exterior of a facility in real-time and control various devices associated therewith.

Figure 2:
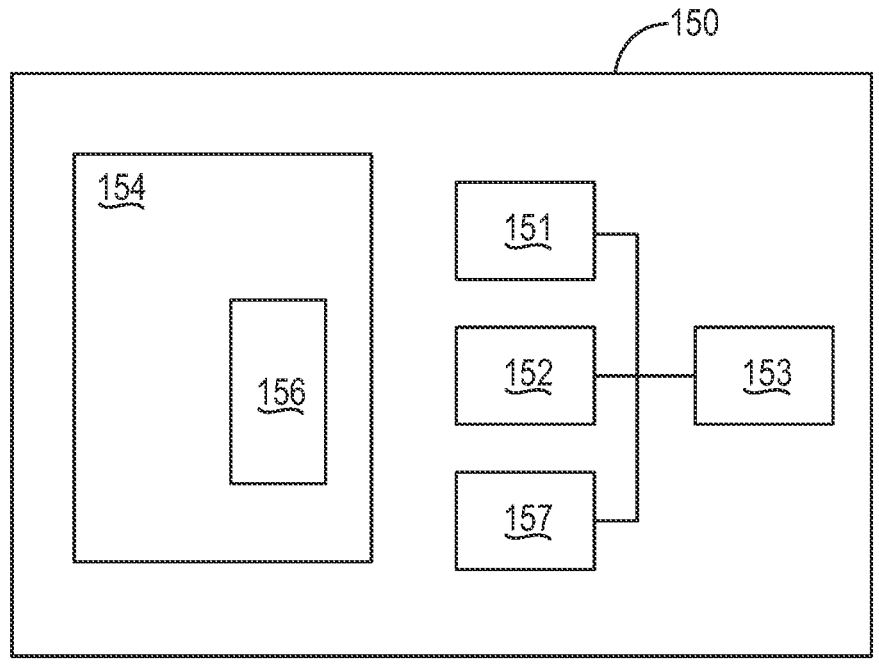
FIG. 2 is a block diagram of a controller of the security system of FIG. 1.

Referring now to FIG. 2, each of the plurality of devices associated with the security system 100 may include a controller 150, such as a programmable logic controller (PLC) to name one example. The controller 150 may be housed within each of the plurality of devices. The security system 100 may also include one or more controllers 150 that are independent of the plurality of devices. The controller 150 may be associated with and/or coupled to the communications network 130 of the security system 100. The controller 150 may be configured to receive input signals from various sensors. Similarly, the controller 150 may generate control signals for controlling various operations of the security system 100 and/or specific devices.

The controller 150 includes or may be associated with a processor 151, a computer readable medium 152, a data base 153, and an input/output module or control panel 154 having a display 156. It is understood that the controller 150 described herein may be a single controller having all of the described functionality, or it may include multiple controllers wherein the described functionality is distributed among the multiple controllers. Various operations, steps, or algorithms as described in connection with the controller 150 can be embodied directly in hardware, in a computer program product such as a software module executed by the processor, or in a combination of the two. The computer program product can reside in RAM memory, flash memory, ROM memory, EPROM memory, EEPROM memory, registers, hard disk, a removable disk, or any other form of computer-readable medium known in the art. An exemplary computer-readable medium 152 can be coupled to the processor 151 such that the processor 151 can read information from, and write information to, the memory/storage medium. In the alternative, the medium 152 can be integral to the processor 151. The processor 151 and the medium 152 can reside in an application specific integrated circuit (ASIC). The ASIC can reside in a user terminal. In the alternative, the processor 151 and the medium 152 can reside as discrete components in a user terminal.

The term "processor" 151 as used herein may refer to at least general-purpose or specific-purpose processing devices and/or logic as may be understood by one of skill in the art, including but not limited to a microprocessor, a microcontroller, a state machine, and the like. A processor 151 can also be implemented as a combination of computing devices, e.g., a combination of a DSP and a microprocessor, a plurality of microprocessors, one or more microprocessors in conjunction with a DSP core, or any other such configuration.

The controller 150 may include a transceiver 157 operable to send and receive control signals. The transceiver 157 may comprise a wired or wireless connection medium. The transceiver 157 may permit communications across a communication medium using known communications protocols or proprietary communication protocols. For example, the transceiver 157 may permit the use of Ethernet, Bluetooth, Wi-Fi, a wireless application protocol, an IEEE 802 standard, or any other communications protocol, configuration, or implementation.

In one exemplary embodiment, the transceiver 157 may be configured to communicate with a software application running on a device. For example, the transceiver 157 may be configured to send and receive messages relating to a user device 120 running the software application (e.g., by means of a user interface executed upon a device). The software application may be configured such that a user of the software may cause the controller 150 to actuate various operations corresponding to a user's command. The controller 150 may permit a great variety of desired automation and remote-control capabilities.

It will be understood by one of skill in the art that any of the functions described herein associated with the controller 150 of each individual device may also be performed by a controller 150 associated with the security system 100 independent of an individual device.

Referring now to FIGS. 3-9, the security system 100 may include one or more locking devices generally designated 200. Although described with reference to a lock or locking, it should be appreciated that the locking device 200 may functionally operate as a barrier to restrict movement of an object, and thus should not be narrowly construed as merely a traditional lock, and does not require a particular "key" or physical or electronic unlocking device to operate. Accordingly, the locking device 200 may take the form of a barrier apparatus consistent with the disclosure provided herein.

While certain features may be described in association with a specific exemplary embodiment of the locking device 200, it is within the spirit of the present disclosure for those features to be further associated with any other embodiment of the locking device 200.

Figure 5:
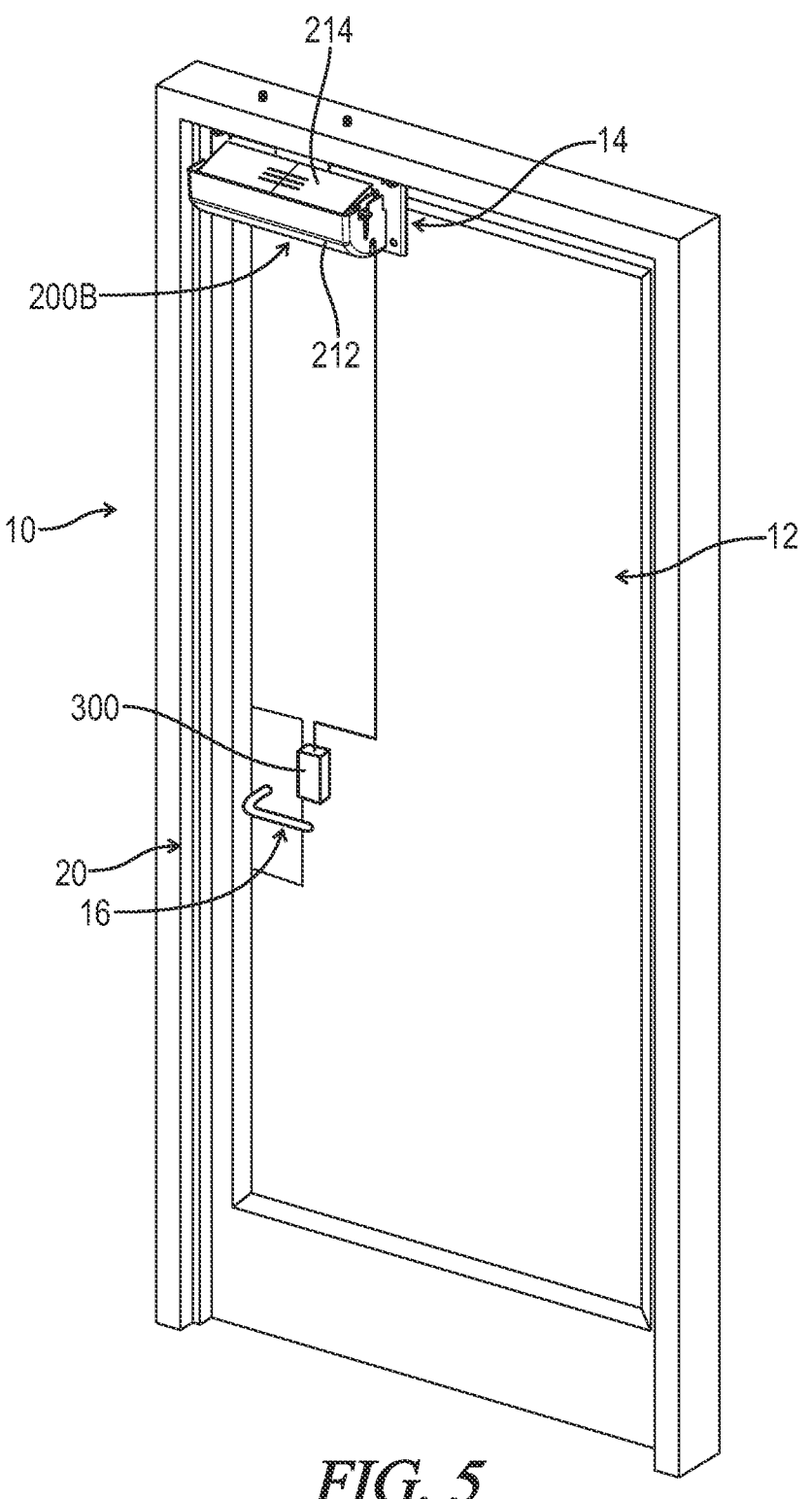
FIG. 5 is an elevated perspective view of the security system of FIG. 1 associated with a door assembly.
Figure 6:
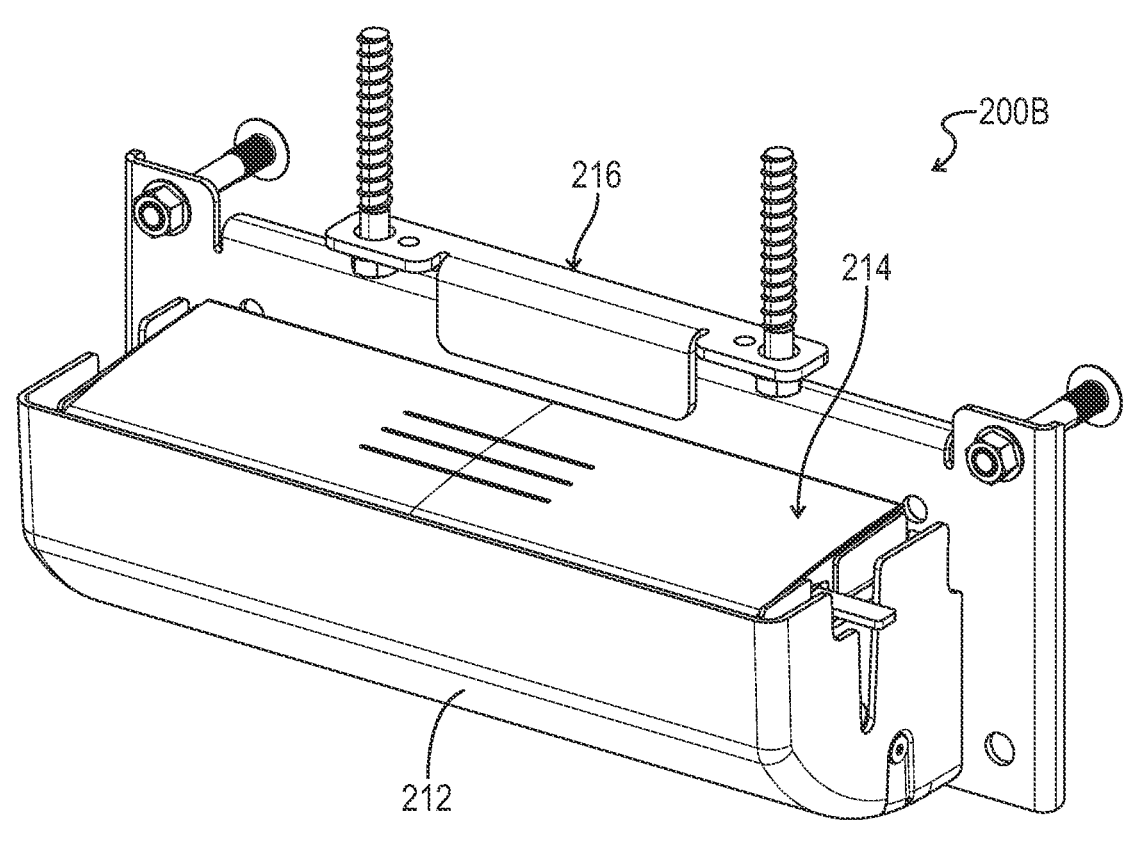
FIG. 6 is an elevated perspective view of a locking device of the security system of FIG. 1.

Each locking device 200 may be associated with a conventional door assembly 10. An exemplary embodiment of the door assembly 10 is illustrated in FIG. 5. The door assembly 10 includes an openable element 12 surrounded by a frame 20. The openable element 12 may also be referred to herein as a door 12. The door 12 may pivotally swing away from and toward the frame 20 to allow for a user to enter through and exit from the door assembly 10. The door 12 may include an upper edge portion 14 and a handle assembly 16.

The handle assembly 16 may be operable to selectively engage the frame 20, thus allowing the door 12 to pivotally swing away from and toward the frame 20. Specifically, when the handle assembly 16 is not engaged by a user, the door assembly 10 may exist in a latched or closed configuration wherein the door 12 is nested within the frame 20 and a portion of the handle assembly 16 engages the frame 20 restricting movement of the door 12 relative to the frame 20. When a user engages the handle assembly 16, the door assembly 10 may exist in an unlatched configuration wherein the handle assembly 16 does not engage the frame 20 and thus, the door 12 may be unnested from the frame 20.

Figure 3:
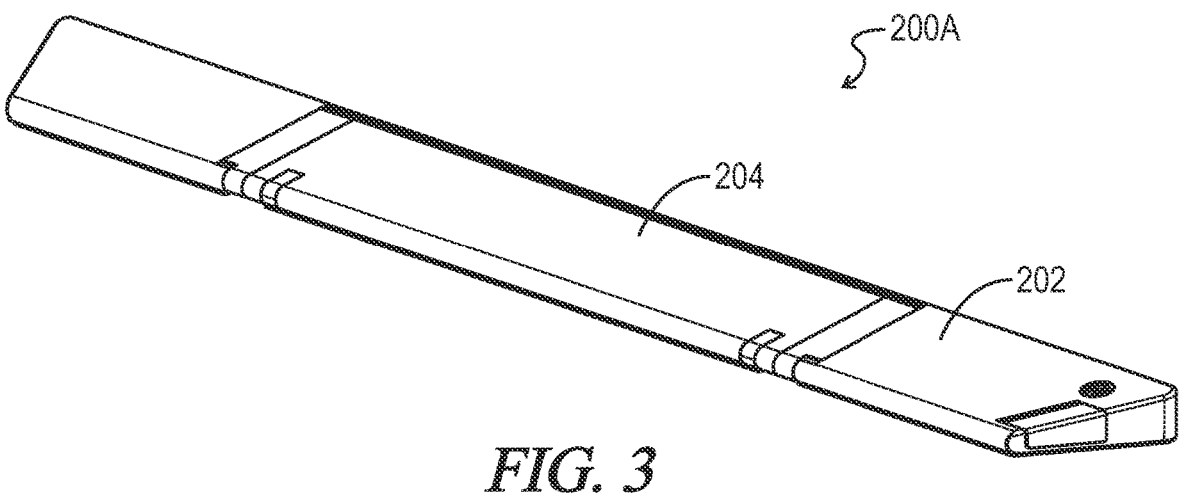
FIG. 3 is an elevated perspective view of a locking device of the security system of FIG. 1.
Figure 4:
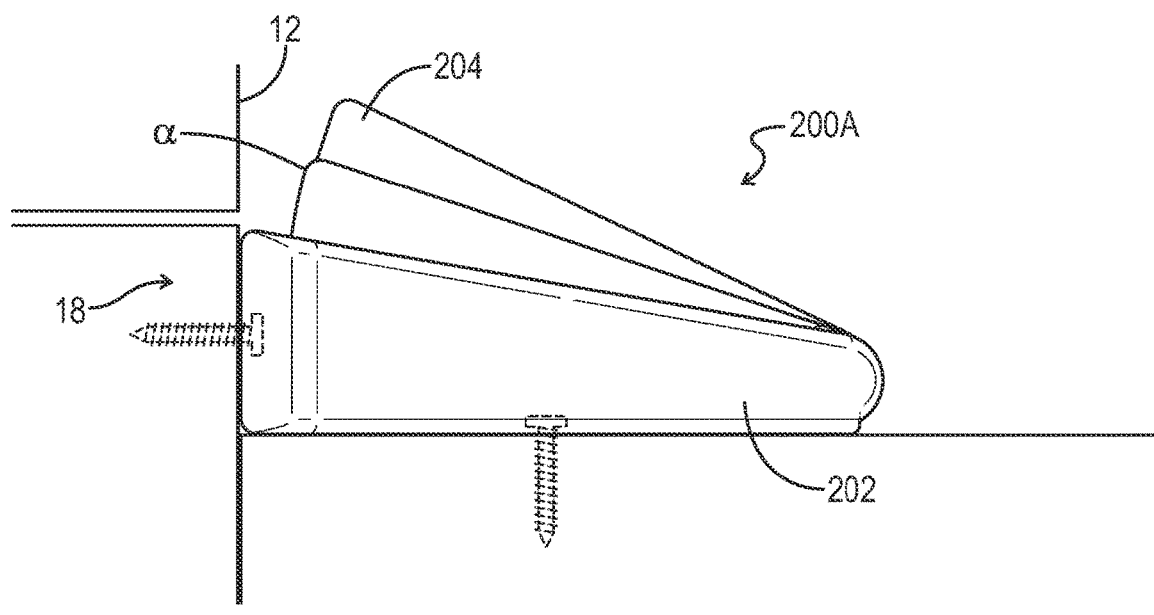
FIG. 4 is a side view of the locking device of FIG. 3.

An optional embodiment of the locking device 200 is illustrated in FIGS. 3-4 and generally designated 200A. The locking device 200A may include a chassis 202, a lifting member 204, and an actuator. The actuator may be variously implemented to provide for lifting power necessary to raise and/or lower lifting member 204 during operation. In one optional embodiment, the actuator may comprise a servo; however any actuating device capable of manipulating a physical location of lifting member 204 may be used within the spirit and scope of the present disclosure. The actuator may be configured to provide an output corresponding to a locked and an unlocked configuration. For example, the actuator may be configured in one optional embodiment to provide output rotation at a designated amount in a designated direction corresponding to each configuration. The shape of the chassis 202 and the lifting member 204 may vary based upon desired usage, thus an overall shape of the locking device 200A may vary. At least a portion of the lifting member 204 may be configured to elevate during operation of the locking device 200A. In one exemplary embodiment described herein, at least a portion of the lifting member 204 may be elevated more at a proximal side of the locking device 200A relative to the door frame 20 than at a distal side relative to the door frame 20. In doing so, a force applied at the lifting member 204 by contact with a door 12 or other object may be translated downwardly along the lifting member 204 and into a surface to which the locking device 200A is mounted, thereby increasing an amount of force capable of being resisted by the locking device 200A.

The locking device 200A may be operable in the locked configuration, as shown in FIG. 4. The locking device 200A may be mounted upon an intended mounting surface (e.g., an interior floor). At least one surface of the locking device 200A may be optionally placed in contact with a threshold 18 of the door assembly 12. The door 12 may be configured to open inwardly toward the locking device 200A. When the door 12 is opened, it may contact the lifting member 204 of locking device 200A at a contact surface a. In operation, as the door is placed in contact with the contact surface a, force associated with opening the door inwardly may be translated across the lifting member 204 of the locking device 200A and into the intended mounting surface and/or threshold 18. By doing so, door 12 opening may be resisted or prevented, and entry may be denied.

When the locking device 200A is in the unlocked configuration, the door 12 is free to open inwardly without being placed in contact with contact surface a because contact surface a is nested within the locking device 200A when operating in the unlocked configuration.

Another optional embodiment of the one or more locking devices 200 is illustrated in FIGS. 5-9 and generally designated 200B. The locking device 200B may include a chassis 212, a lifting member 214, a stop plate 216, and an actuator. The actuator may be variously implemented to provide for lifting power necessary to raise and/or lower lifting member 214 during operation. In one optional embodiment, the actuator may comprise a servo; however any actuating device capable of manipulating a physical location of lifting member 214 may be used within the spirit and scope of the present disclosure. The actuator may be configured to provide an output corresponding to a locked and an unlocked configuration. For example, the actuator may be configured in one optional embodiment to provide output rotation at a designated amount in a designated direction corresponding to each configuration. The shape of the chassis 212 and the lifting member 214 may vary based upon desired application. Thus, an overall shape and configuration of the locking device 200B may vary. At least a portion of the lifting member 214 may be configured to elevate during operation of the locking device 200B.

In certain optional embodiments, the locking device 200B may be configured to be coupled directly to the door 12 and function in combination with the stop plate 216 coupled to the frame 20 surrounding the door 12. The stop plate 216 may be aligned with at least a portion of the lifting member 214 for restricting movement of the door 12 when the lifting member 214 is raised. At least the chassis 212 of the locking device 200B may be coupled to the door 12. In certain embodiments, the chassis 212 may be configured to be coupled along the upper edge portion 14 of the door 12.

Figure 7:
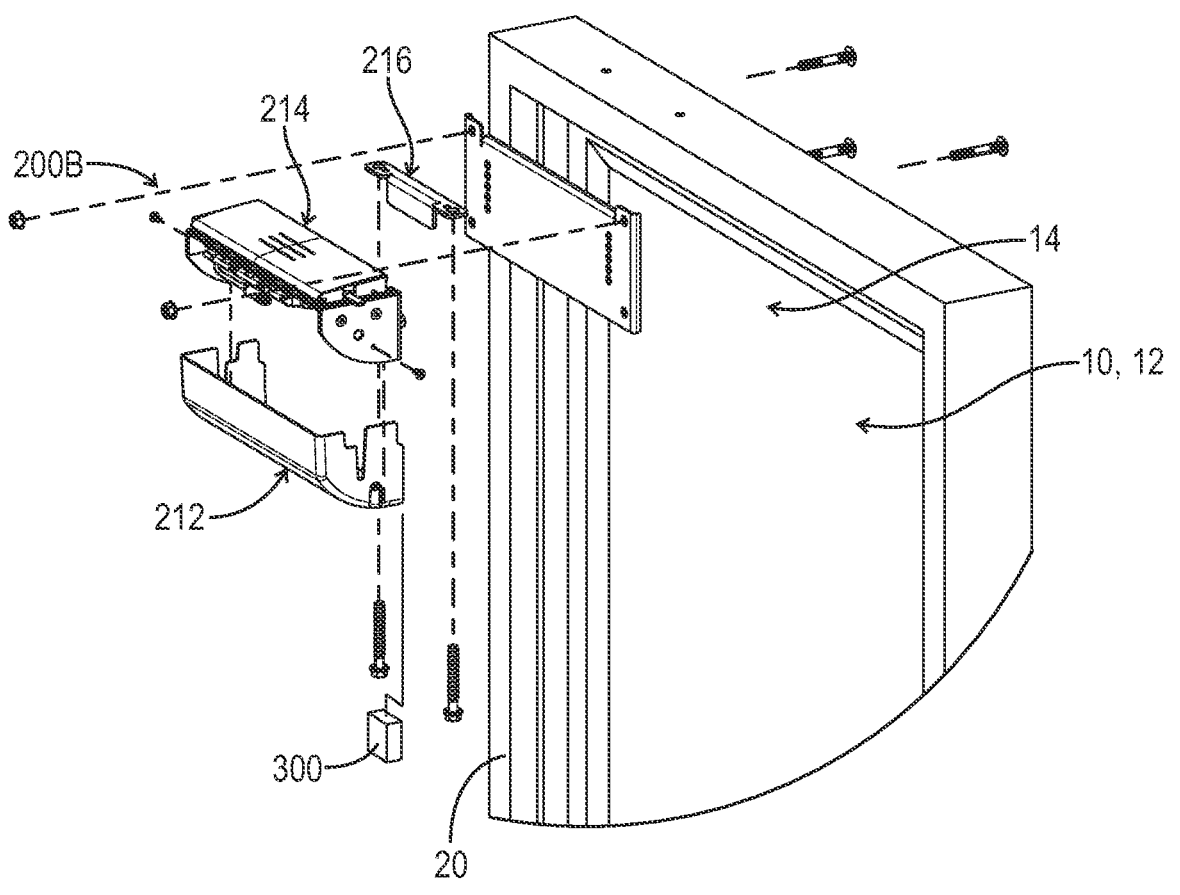
FIG. 7 is an exploded view of the locking device of FIG. 6 associated with a door assembly.
Figure 8:
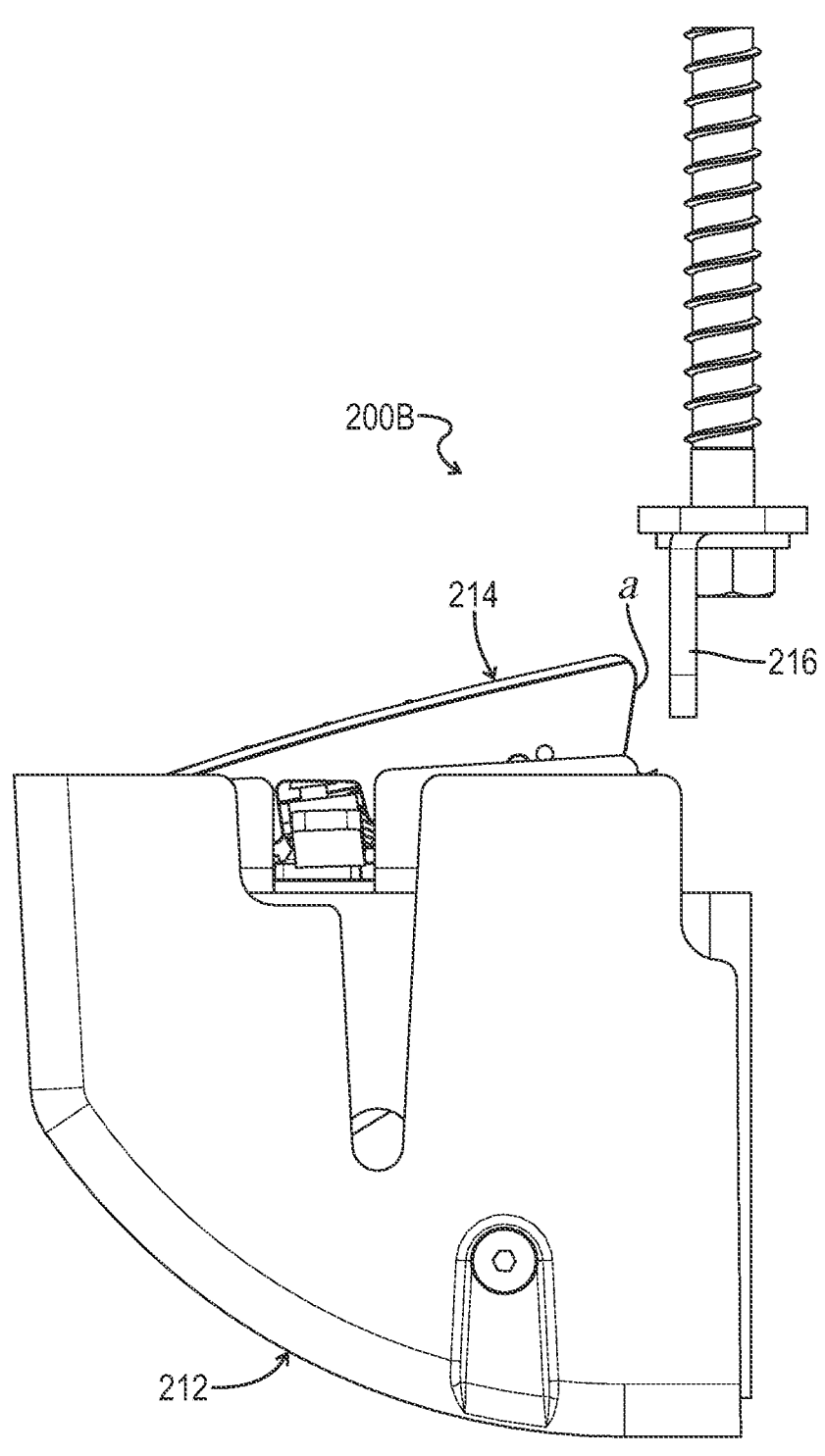
FIG. 8 is a side view of the locking device of FIG. 6.

The door 12 of the door assembly 10 may be configured to outswing (shown in FIGS. 5 and 7) or inswing (not shown). In certain optional embodiments (e.g., outswing embodiments of the door 12), as illustrated in FIGS. 5 and 7, the contact surface a of the lifting member 214 may face the door 12. In accordance with this embodiment, the stop plate 216 may be positioned between the door 12 and the contact surface a of the lifting member 214 when the door 12 is closed (e.g., fully nested within the frame 20) and when the lifting member 214 is raised. Other optional embodiments of the locking device 200B may be operable with door assemblies 10 having an inswing door.

In operation, the locking device 200B may be operable in at least a locked configuration and an unlocked configuration. In the locked configuration, the lifting member 214 may be raised such that the door 12 may not move away from the frame 20. Specifically, the stop plate 216 may restrict movement of the door 12 by engaging the contact surface a of the lifting member 214. A force associated with opening the door 12 may be translated across the stop plate 216 and into a surface to which the stop plate is mounted, such as the frame 20 of the door assembly 10. By doing so, opening of the door 12 may be resisted or prevented, and entry may be denied.

In the unlocked configuration, the lifting member 214 of the locking device 200B may be lowered such that the door 12 may move freely away (e.g., unnest) from the frame 20. Thus, when the door 12 is moved away from the frame 20, the lifting member 214 may pass underneath the stop plate 216 without contacting the stop plate 216.

In addition to the illustrated embodiments, the locking device 200 may be implemented at or on any surface upon which movement of an object to be restrained may be restricted. For example, the locking device 200 may be positioned at a vertical portion of a door or window frame or sill and may operate in the same manner as previously described to restrict movement of an object whose movement is intended to be restricted.

Thus, as mentioned above, each of the one or more locking devices 200 may be operable in the locked and unlocked configuration. In the locked configuration, the lifting member 204, 214 may be raised such that the door 12 may not move away from the frame 20. In the unlocked configuration, the lifting member 204, 214 of the locking device 200 may be lowered such that the door 12 may move freely away (e.g., unnest) from the frame 20.

Each locking device 200 may be placed in the locked or unlocked configuration in a number of ways. In certain optional embodiments, each locking device may be manually manipulated by a user between the locked and unlocked configurations, for example through the actuation of a lever or switch.

In certain optional embodiments, the security system 100 may include a panic button and/or an egress button. The panic button and egress button may be connected to the locking device 200 via a wired or wireless connection. In certain optional embodiments, the panic button and egress button may be mounted adjacent to a door assembly 10. In other optional embodiments, the panic button may be located distal to the door assembly 10, for example adjacent to a teacher's desk in a school setting. The panic button may be operable to place the locking device 200 in the locked configuration when the panic button is pressed. The egress button may be operable to place the locking device 200 in the unlocked configuration when the button is pressed. The panic and/or egress button may be associated with a single locking device 200 or may be associated with a plurality of locking devices 200.

Each locking device 200 may be manipulated between the locked and unlocked configurations remotely. For example, a remotely located user may cause, via a user device 120 coupled to the security system 100, the locking device 200 to transition into the locked configuration.

Figure 9:
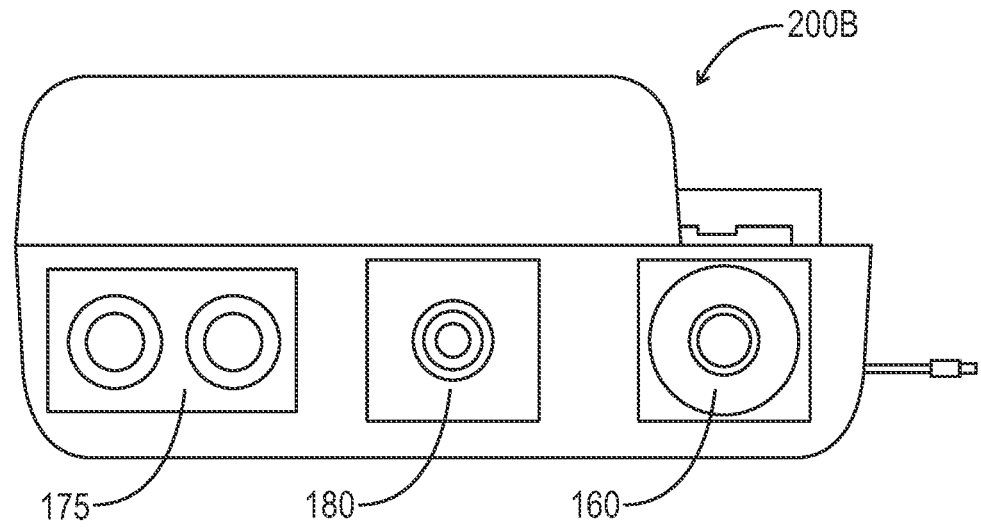
FIG. 9 is a partial schematic view of a locking device of the security system of FIG. 1.
Figure 10:
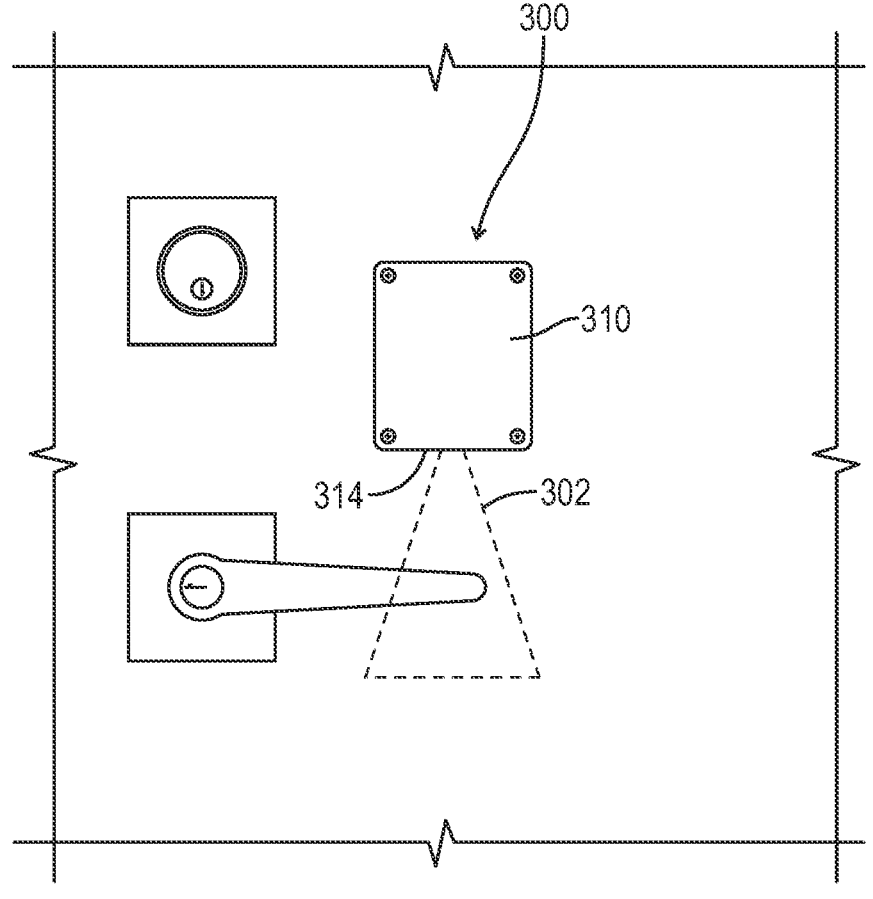
FIG. 10 is a schematic view of a motion sensor of the locking system of FIG. 1 associated with a door assembly.
Figure 11:
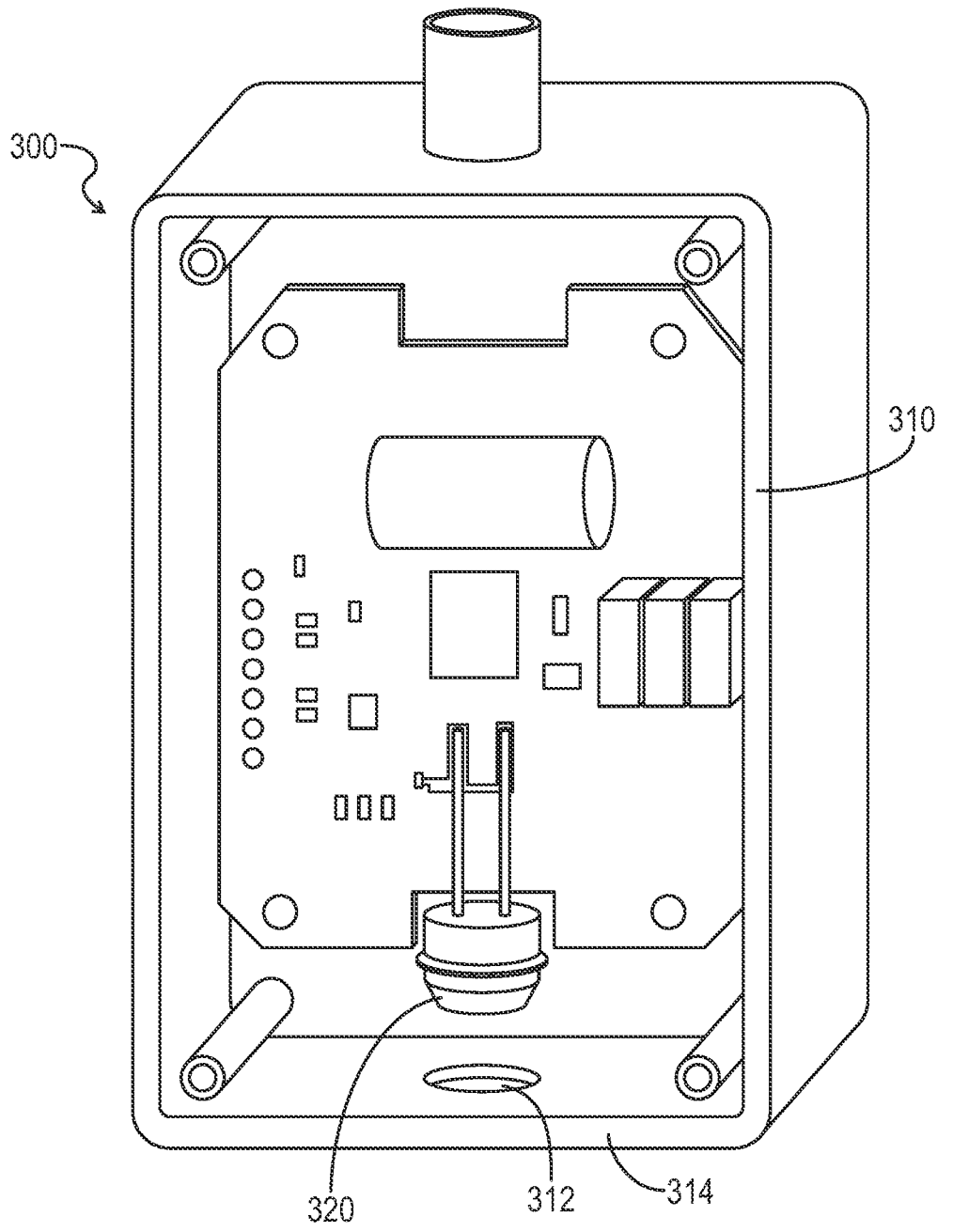
FIG. 11 is an elevated perspective view of the motion sensor of FIG. 10 wherein a portion of the motion sensor is removed.

Each locking device 200 may include one or more components associated therewith. Each of the components may be housed at least partially within the chassis 202, 212 of the one or more locking devices 200, as shown in FIG. 9. In certain embodiments, the chassis 202, 212 may be modular such that it may receive a variety of components in various configurations. Thus, components associated with the chassis 202, 212 may be interchanged based on the desired application. The components may also be replaced when they become outdated or reach an end of useful life without having to replace the chassis 202, 212. The modular nature of the chassis 202, 212 may enable the locking device 200 to adapt to future desired applications that are not contemplated at the time of design of the chassis 202, 212.

In certain optional embodiments, the locking device 200 may include power over ethernet (PoE) connectively through a CAT 6 port. Thus, a variety of desired devices for various applications may communicate with and be selectively powered by the locking device 200.

A plurality of the locking devices 200 may be positioned within a facility and configured to secure a plurality of corresponding rooms. In certain optional embodiments, the locking devices 200 may communicate directly with one another using any known communications protocol. In certain optional embodiments, the locking devices 200 may be connected to the communications network 130 and communicate therethrough. Each of the locking devices 200 may be controlled in unison, controlled in desired groups, and/or controlled individually.

Referring back to FIG. 1, in certain optional embodiments, the locking devices 200 may include a force detection sensor 155. The force detection sensor 155 may be a capacitive Micro-Electro-Mechanical System (MEMS) type, a piezoresistive type, a piezoelectric style accelerometer, or any other device capable of detecting motion or impact and capable of generating and/or providing a signal as output corresponding thereto. The force detection sensor 155 may be operable to detect at least a force received by the locking device 200 when the locking device 200 is in the locked configuration and may generate at least a signal corresponding thereto. One or more output signals of the force detection sensor 155 may be provided to the controller 150 of the locking device 200 and/or to the communications network 130. The controller 150 of the locking device 200 and/or the communications network 130 may receive the output signals, determine that an attempted entry has occurred, and output an alert to at least an associated user device 120 and/or emergency services.

In certain optional embodiments, each locking device 200 may include an occupancy sensor 160. The occupancy sensor 160 may be operable to at least detect the presence of one or more persons within a proximity of the occupancy sensor 160 and may generate at least a signal corresponding thereto. One or more output signals of the occupancy sensor 160 may be provided to the controller 150 of the locking device 200 and/or to the communications network 130. The controller 150 of the locking device 200 and/or the communications network 130 may receive the output signals, determine a number of people in the room, and generate output signals representing an occupancy number. In certain desired applications, output signals from the occupancy sensor 160 may be useful for determining whether the locking device 200 should be placed in the locked configuration.

In certain optional embodiments, each locking device 200 may include a smoke/fire/heat sensor, carbon monoxide/dioxide sensor, radon, air pressure, humidity, temperature, air quality, and/or other environmental sensor generally designated by the number 165. The environmental sensor 165 may be operable to detect smoke, fire, heat, carbon monoxide, carbon dioxide, radon, air pressure, humidity, temperature, air quality, and/or the like. The environmental sensor 165 may generate at least a signal corresponding to a detected environmental condition. One or more output signals of the environmental sensor 165 may be provided to the controller 150 of the locking device 200 and/or to the communications network 130. The controller 150 of the locking device 200 and/or the communications network 130 may receive the output signals and output an alert to at least an associated user device 120 and/or emergency services. The controller 150 of the locking device 200 may utilize information from the environmental sensor 165 to generate audio communications and present said communications using speakers of the locking device 200 and/or automatically place the locking device 200 in the unlocked configuration. The controller 150 may generate output signals representing at least an environmental state of the room or other adjacent area.

In certain optional embodiments, each locking device 200 may include a shooter detection sensor 170, which may comprise one or more of a sound sensor, a light flash sensor, or the like. The shooter detection sensor 170 may be operable to detect the presence of a shooter (e.g., via the detection of a visual muzzle flash or audible gunshot sound) and may generate at least a signal corresponding thereto. One or more output signals of the shooter detection sensor 170 may be provided to the controller 150 of the locking device 200 and/or to the communications network 130. The controller 150 of the locking device 200 and/or the communications network 130 may receive the output signals and output an alert to at least an associated user device 120 and/or emergency services. The controller 150 of the locking device 200 may lock the locking device 200 upon receiving the output signals. The controller 150 may communicate with all other communicatively linked locking devices 200 of the security system 100 via the communication network 130 and trigger a locking function in order to simultaneously lock all or a select portion of rooms within a given facility.

In certain optional embodiments of the one or more locking devices 200, each locking device 200 may include a light detection and ranging (LIDAR) sensor 175. The LIDAR sensor 175 may be operable to detect distances and positions of objects within a field of view of the LIDAR sensor 175. The LIDAR sensor 175 may be operable as a terrestrial LIDAR sensor. The LIDAR sensor 175 may generate output signals representing a position of an object relative to the LIDAR sensor 175. The LIDAR sensor 175 may include a light source and an optical receiver. The light source may include a laser capable of emitting a beam of light (commonly referred to as pulse light) having a particular operating wavelength, said operating wavelength being in the infrared, visible, ultraviolet, or other portions of the electromagnetic spectrum. When the beam of light contacts the object, the beam of light may be scattered and some of the light may be received back by the optical receiver (commonly referred to as return light). The LIDAR sensor 175 may be operable to determine the distance between the LIDAR sensor 175 and the object based on one or more characteristics associated with the received light. The distance between the LIDAR sensor 175 and an object and the position of the object relative to the LIDAR sensor 175 may be expressed in a Cartesian coordinate system, a spherical coordinate system, or the like.

The LIDAR sensor 175 may generate output signals to at least the controller 150 of the locking device 200 and/or to the communications network 130. The LIDAR sensor 175 may communicate with all other communicatively linked locking devices 200 of the security system 100 via the communication network 130 and trigger a locking function in order to simultaneously lock all or a select portion of rooms within a given facility.

The LIDAR sensor 175 may also generate output signals on the communications network 130 that are received by the interactive interface 110. At least the output signals from the LIDAR sensor 175 may be used by the interactive interface 110 to build a virtual model of an interior of a facility. The virtual model may include substantially all of the physical features of the interior of the facility. Moreover, output signals from multiple LIDAR sensors 175 placed throughout a facility may be meshed together to create a complete virtual model of the interior of the facility. The LIDAR sensor 175 may also track the movement of objects, for example the movement of people, within a facility. Information related to the movement of people may be useful to first responders when entering a facility to neutralize a threat.

In certain optional embodiments of the one or more locking devices 200, each locking device 200 may include one or more cameras 180. The one or more cameras 180 may generate output signals representing images of a camera viewing area. The camera viewing area may include the interior of a room and/or the exterior. In certain optional embodiments of the locking device 200, a first of the one or more cameras 180 is directed into the interior of a room and a second of the one or more cameras 180 is directed away from of the room. The one or more cameras 180 may include filtering/blurring features that protect the privacy of individuals detected by the one or more cameras 180. One or more output signals of the cameras 180 may be provided to the controller 150 of the locking device 200 and/or to the communications network 130. The controller 150 of the locking device 200 and/or the communications network 130 may receive the output signals. The controller 150 may communicate with all other communicatively linked locking devices 200 of the security system 100 via the communication network 130 and trigger a locking function in order to simultaneously lock all or a select portion of rooms within a given facility. Output signals of the cameras 180 may be used by the interactive interface 110 to model and map the interior of the facility. The one or more cameras 180 may also track the movement of objects, for example the movement of people, within the facility.

One of skill in the art will appreciate that while the various sensors, such as the occupancy sensor 160, the LIDAR sensor 175, and the cameras 180, are described as being associated with a corresponding locking device 200, the various sensors may also exist independent of the locking device 200. For example, each sensor may be freestanding or may be coupled to another device of the security system 100 that is not a locking device 200.

Each of the one or more locking devices 200 may be controlled using a user device 120 such as a smart phone, a linked key fob, a linked egress button mounted adjacent to or near the frame 20 of the door assembly 10, a linked panic button mounted near the frame 20 of the door assembly, or manually to name a few examples. Thus, each locking device 200 may be linked to a panic button positioned remotely from the locking device 200, wherein activation of the panic button causes the locking device 200 to enter the locked configuration. Each locking device 200 may be linked to an egress button positioned remotely from the locking device 200, wherein activation of the egress button causes the locking device 200 to enter the unlocked configuration. In certain optional environments, the panic button and egress button may be combined into a toggle switch or like. The locking device 200 may be deployed with various other accessories that enable or improve functionalities of the locking device 200 whether discussed above or not.

Referring now to FIGS. 10-13, another accessory that may be associated with the locking device 200 is a motion sensor 300. The motion sensor 300 may generally be operable to detect motion of an object. The motion sensor 300 may be a passive-infrared (PIR) sensor configured to measure infrared (IR) light radiating from objects in a sensor field of view 302 of the motion sensor 300. However, any sensor capable of detecting motion within a field of view may be used within the spirit and scope of the present disclosure.

Figure 12:
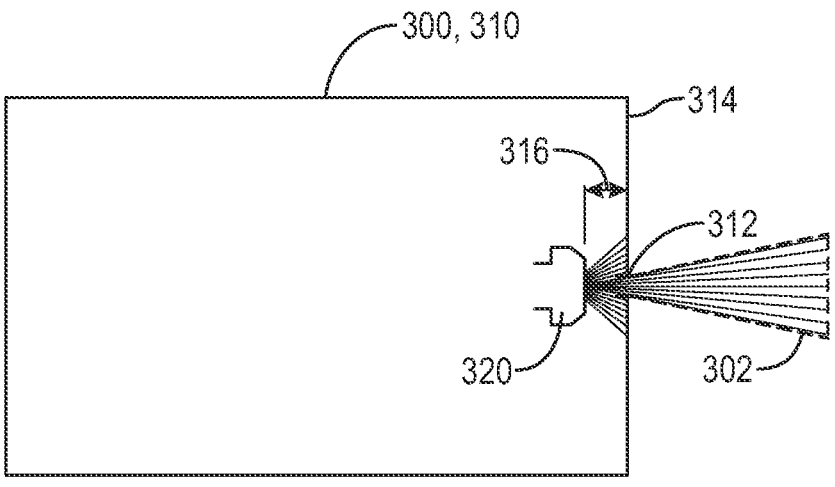
FIG. 12 is a schematic view of the motion sensor of FIG. 10 showing a sensor field of view.
Figure 13:
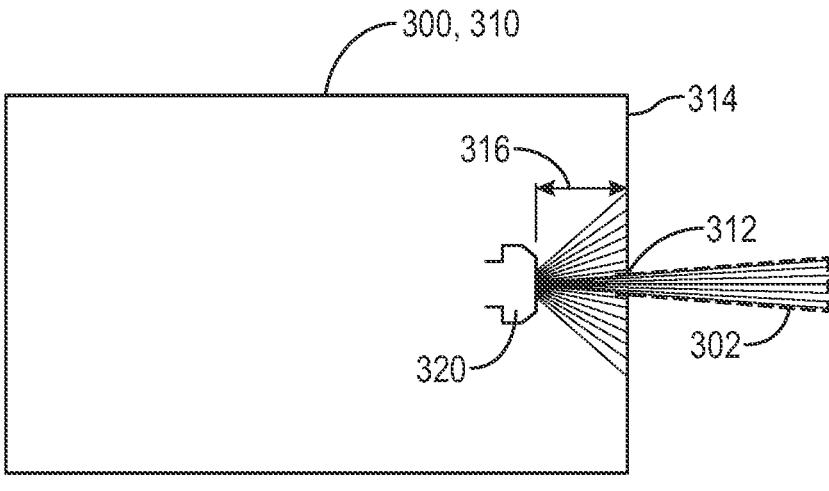
FIG. 13 is a schematic view of the motion sensor of FIG. 10 showing a sensor field of view.

The motion sensor 300 may include a sensing hole 312 defined in a first end 314 of a sensor housing 310. The motion sensor 300 may detect motion through the sensing hole 312 in the sensor field of view 302. Exemplary sensor fields of view 302 are illustrated in FIGS. 12 and 13.

The motion sensor 300 may be attached to a surface upon which it is intended to be mounted using any one of at least one fastener, at least one hook and loop fastener, an adhesive material (e.g., any double sided tape, a tape such as 3M™ VHB™, etc.), or any other means of attachment, either alone or in combination. However, the motion sensor 300 is preferably attached to a surface upon which it is intended to be mounted using VHB™ adhesive material. The motion sensor 300 may further include a mounting end that is substantially flat. In one exemplary embodiment, the motion sensor 300 may be mounted to an intended mounting location by placing VHB™ adhesive material onto the mounting end and securing the motion sensor 300 onto the surface upon which the motion sensor 300 is intended to be mounted. In other optional embodiments, the motion sensor 300 may be mounted to an intended mounting location by placing a fastener through the mounting end and into the surface upon which the motion sensor 300 is intended to be mounted. In one optional embodiment, the mounting end may be adjacent to the first end 314 of the motion sensor 300.

The motion sensor 300 may be mounted to the door 12 generally adjacent to the handle assembly 16. The motion sensor 300 may be mounted to the door 12 such that the handle assembly 16 is within the sensor field of view 302 of the motion sensor 300. In one embodiment, the motion sensor 300 may be mounted to the door 12 above the handle assembly 16 wherein the sensing hole 312 of the motion sensor 300 points generally towards the handle assembly 16. The sensing hole 312 may be located a distance above the handle assembly 16 in a range of from 2 inches to 8 inches, preferably from 3 inches to 7 inches, and most preferably form 4 inches to 6 inches.

The motion sensor 300 may be configured such that the sensor field of view 302 is limited to a certain area. An exemplary sensor field of view 302 shown in FIG. 10. In one embodiment, the sensor field of view 302 may be limited by at least a diameter of the sensing hole 312 defined in the sensor housing 310 and a distance 316 between a sensing member 320 of the motion sensor 300 and the sensing hole 312. The sensor field of view 302 may be altered simply by adjusting the distance 316 between the sensing member 320 and the sensing hole 312. In one optional embodiment, the distance 316 may be in a range of from 0.1 millimeters to 6 millimeters, preferably from 0.5 millimeters to 4 millimeters, and most preferably from 1 millimeters to 2 millimeters. The sensor field of view 302 may be altered by adjusting the diameter of the sensing hole 312. In one optional embodiment, the sensing hole 312 has a diameter in a range of from 0.4 millimeters to 4 millimeters, preferably from 0.8 millimeters to 3 millimeters, and most preferably from 1 millimeters to 2 millimeters.

FIGS. 12 and 13 schematically illustrate two exemplary configurations of the motion sensor 300. Specifically, two different distances 316 are shown between the sensing member 320 and the sensing hole 312, thus creating two different sensor fields of view 302. As shown in FIG. 12, the closer the sensing member 320 is to the sensing hole 312, the larger the sensor field of view 302 may be. As shown in FIG. 13, the further the sensing member 320 is from the sensing hole 312, the smaller the sensor field of view 302 may be.

The motion sensor 300 may be configured to only detect motion occurring at or substantially close to the handle assembly 16 of the door 12. Therefore, the motion sensor 300 may only detect a user's engagement of the handle assembly 16, and not the movement of objects or people in the general vicinity of the motion sensor 300. One advantage of such a configuration may be that inadvertent unlocking of the locking device 200 is prevented.

Each motion sensor 300 may be connected to a corresponding locking device 200 via a wired or wireless connection. In one embodiment, the motion sensor 300 may be connected to the locking device 200 via a sensor cable. The locking device 200 may have a connection port operable for connection with the sensor cable. The connection port may be in communication with a controller 150 associated with the locking device 200. In optional embodiments of the locking device 200, the connection port may remain unconnected if the locking device 200 does not include the motion sensor 300 or the motion sensor 300 is wirelessly connected to the locking device 200. In other optional embodiments, the sensor cable of the motion sensor 300 may be coupled to the connection port of the locking device 200, thus establishing a wired connection between the locking device 200 and the motion sensor 300. The sensor cable may be connected to the connection port of the locking device 200 via a barrel connector. However, any connector capable of coupling two cables may be used within the spirit and scope of the present disclosure.

The motion sensor 300 may include a battery or other power source. In one optional embodiment, the battery may be a CR123A 3V lithium battery. The motion sensor 300 may be powered via the battery and thus independently from the locking device 200. The locking device 200 may be configured such that when the battery of the motion sensor 300 reaches a threshold level of remaining power, the motion sensor 300 will pull power from the associated locking device 200. Thus, the motion sensor 300 may avoid inoperability by drawing power from the locking device 200. In certain optional embodiments, the threshold may correspond to 20% or less power remaining in the battery. However, in other optional embodiments, the threshold may correspond to 10% or less power remaining, 15% or less power remaining, or any other desired percentage of power remaining.

The motion sensor 300, an associated locking device, and/or the security system 100 may indicate when the motion sensor 300 and/or an associated locking device 200 reaches a threshold level of remaining power, for example, through a notification in the software application running on a user device 120 or through emitting an audible sound. The threshold level of remaining power may correspond to when the battery of the motion sensor 300 reaches a certain voltage, for example when the battery of the motion sensor 300 drops below 2.5 volts. In certain optional embodiments, the audible sound may be a "chirp" every 2.5 minutes or any other interval of time. In certain optional embodiments, different audible sounds or frequency of audible sounds may be used to indicate different conditions.

The motion sensor 300 may be operable to generate signals representing motion within the sensor field of view 302. These signals may be referred to herein as motion signals. The motion sensor 300 may output the motion signals to the controller 150 of an associated locking device 200. The controller 150 may receive the motion signals from the motion sensor 300 and, if the locking device 200 is in the locked configuration, unlock the locking device 200 by lowering the lifting member 204, 214 of the locking device 200. In one optional embodiment, when the motion sensor 300 detects motion within the sensor field of view 302, the motion sensor's 300 output may be pulled low for a period of time and repeated in a pattern. For example, the motion sensor's 300 output may be pulled low for 48 milliseconds three times every 5 seconds. This pulsing may repeat indefinitely for a period of time, every 20 seconds for example, until motion is no longer detected.

The motion sensor 300 may further be operable to selectively unlock the locking device 200 in less than 5 seconds, preferably less than 3 seconds, and most preferably less than 1 second. In use, a user may place the locking device 200 in the locked configuration wherein the door 12 is nested within the frame 20 and the lifting member 204, 214 is raised. The user may then be secured within an interior of a location. The sensor field of view 302 of the motion sensor 300 may be directed towards the handle assembly 16 of the door 12. If a user wishes to exit the interior of the location, the user need only engage the handle assembly 16 of the door 12, as they would with a conventional door assembly 10. When the user engages or turns the handle assembly 16 in an effort to open the door 12, the motion sensor 300 may detect motion at or substantially near the handle assembly 16. The motion sensor 300 may then generate signals representing motion within the sensor field of view 302. The controller 150 associated with the locking device 200 may receive these signals and lower the lifting member 204, 214, thus placing the locking device 200 in the unlocked configuration. The lifting member 204, 214 may be lowered and the locking device 200 placed in the unlocked configuration in less than 1 second from the instant motion was detected by the motion sensor 300. In this way, one motion operation of both the locking device 200 and the door assembly 10 is achieved. A user need not take separate actions to unlock the locking device 200 and open the door 12. The single action of engaging the handle assembly 16 of the door 12 additionally unlocks the locking device 200. One advantage of this configuration may be that a user may quickly egress the interior of the location through the door assembly 10 without taking actions beyond those typically needed to open the conventional door assembly 10.

The security system 100 may employ artificial intelligence (AI) and/or machine learning (ML). For example, the security system 100 may use AI/ML to detect a threat within a facility, such as an active shooter, using components of the security system 100, such as the occupancy sensor 160, the LIDAR sensor 175, or the one or more cameras 180. The security system 100 may trigger a locking function in order to simultaneously lock all or a select portion of rooms within a given facility. Further, the security system 100 may use AI/ML to alert authorities when a threat is detected within a facility.

The security system 100 may include a neural network having at least an input layer and an output layer and employ machine learning. Generally stated, various elements that may be determined by the security system 100 as disclosed herein may include characteristics of the security system 100 that are not directly monitored in real time, but are indirectly determinable using machine learning with respect to other process variables. Machine learning techniques may be implemented to further develop models associated with the security system 100 over time based on the information gathered in subsequent iterations. With each new input data set and corresponding quality metrics, further in view of any number of relevant associated conditions or parameters, the models may be continuously developed, modified, or confirmed for use in subsequent iterations.

Thus, the security system 100 may be a comprehensive system that provides total awareness of at least an interior of a facility, and in some optional embodiments the exterior of the facility. The security system 100 may generate and display interactive interface 110 on a display of a user device 120. The user device 120 could be a smart phone, a smart television, a computer, or the like. The user devices 120 may be coupled to the communications network 130 via a wired or wireless connection. A software application may be associated with the security system 100. The security system 100 may allow a user to restrict access to the interactive interface 110 and the communications network 130 of the security system 100 to specific users. In certain optional embodiments, access to the security system 100 may be password protected.

The security system 100 may provide an access process for first responders, for example police officers, who may not be one of the specific users given access to the interactive interface 110 and the communications network 130 of the security system 100. This access process may be a passcode, password, user override, or the like. Thus, when first responders arrive to a facility employing the security system 100, the access process may allow first responders to utilize and manipulate aspects of the security system 100 neutralize an existing threat and protect those inside the facility.

The interactive interface 110 may include a three-dimensional model or map of at least the interior of a facility. The model or map may be created at least in part based on meshing signals generated by the occupancy sensor 160, LIDAR sensor 175, the one or more cameras 180, a mapping sensor, and/or the various other components/sensors within the security system 100. The model or map may be interactive such that a user may virtually move throughout the facility in real-time as if they were physically present within the facility. Further, the model or map may enable a user to view environmental conditions within specific rooms in the facility. One advantage of the model/map may be that as the model/map is generated in real-time, it allows users to ascertain the current conditions of a facility.

One exemplary use situation for the security system 100 may be a threat, such as an active shooter, within a school. When the threat enters the school, one of the sensors, such as the occupancy sensor 160, LIDAR sensor 175, or one or more cameras 180, may detect the presence of the person and, using AI/ML, categorize the person as a threat. The security system 100 may trigger a locking function in order to simultaneously lock all or a select portion of rooms within a given facility using a plurality of the locking devices 200. The security system 100 may automatically notify emergency services and first responders of the threat.

While the facility is locked down, a situation may arise in which it is desirable to exit the facility. A user located inside a locked-down room may approach the door 12 to exit the room. The user may press the egress button located adjacent to the door 12, thus placing the locking device 200 in the unlocked configuration, and exit the door 12. Alternatively, the user may simply grasp the handle 16 of the door 12 and the motion sensor 300 may detect the user's movement at or near the handle 16. The controller 150 may place the locking device 200 in the unlocked configuration. Thus, the user may egress from through the door assembly 10 with a single motion.

First responders may utilize the interactive interface 110 remotely to gain a real-time awareness of the interior of the facility and the conditions therein. Thus, one such advantage of this security system 100 may be that first responders may gain a better understanding of the layout of an interior of a facility prior to entering. First responders may also identify where the threat is located within the facility and/or the physical characteristics of the threat. Therefore, once on scene, first responders may be able to confidently move through the facility possessing information such as the interior layout of the facility, the conditions of the facility, and the identity of the threat. The interactive interface 110 may be continuously monitored on a user device by first responders located within the facility. Further, the interactive interface 110 may be continuously monitored on a user device by remotely located first responders and communicated to first responders located within the facility. All the while, each of the rooms within the facility may be locked down by the locking devices 200.

Thus, a real-time security system 100 is disclosed herein providing total awareness within a given facility. One benefit of the security system 100 may be providing real-time maps and models of the interior of a facility to assist at least first responders. Moreover, another benefit of the security system 100 may be that it provides a coordinated and efficient approach to locking down a facility.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A security system configured to operate in association with a facility, wherein the facility includes a plurality of rooms with corresponding doors providing access thereto, the security system comprising:

one or more sensors linked to a communications network, each sensor configured to detect an object or event associated with a threat event, wherein the threat event is independent of user credential input, and further wherein the one or more sensors generate an output signal representing the detected threat event;

a plurality of locking devices linked to the communications network, each locking device configured to selectively restrict movement of one of the corresponding doors, each locking device including an actuator and a local controller associated therewith, each local controller configured to:

receive the output signal from the one or more sensors and process the received output signal to determine an actuator command;

provide the actuator command to the actuator of the locking device;

automatically actuate the corresponding lock actuator in response to the detected threat event;

produce an actuator output based on the actuator command, the actuator output operable to manipulate the locking device between a locked configuration and an unlocked configuration, wherein in the locked configuration the locking device resists movement of the door; and propagate a control signal across the communications network to cause other local controllers to actuate respective lock actuators in coordination, thereby initiating a lockdown of the facility and the plurality of rooms in real time.

2. The security system of claim 1, wherein:

the one or more sensors include a light detection and ranging (LIDAR) sensor configured to detect at least a position of an object.

3. The security system of claim 2, further comprising:

a user interface generated in response to at least the output signal from the one or more sensors, the user interface including a three-dimensional map of an interior of the facility of at least the detected object.

4. The security system of claim 3, wherein:

the user interface includes a virtual model of an area detected by the LIDAR sensor.

5. The security system of claim 1, wherein:

the one or more sensors include a camera configured to detect an image field.

6. The security system of claim 5, further comprising:

a user interface generated in response to at least the output signal from the one or more sensors, the user interface including a three-dimensional map of an interior of the facility of at least the detected image field.

7. The security system of claim 6, wherein:

the user interface includes a virtual model of an area detected by the camera.

8. The security system of claim 1, wherein:

the one or more sensors include a motion sensor configured to detect at least motion within a motion sensor field of view; and the controller is configured to manipulate the locking device into the unlocked configuration at least when the motion sensor detects motion.

9. The security system of claim 8, wherein:

the door includes a door handle operable to selectively unnest the door from a door frame, the motion sensor mounted adjacent to the door handle, and the controller configured to manipulate the locking device into the unlocked configuration at least when the motion sensor detects a user actuating the door handle.

10. The security system of claim 1, wherein:

each of the one or more sensors is configured to draw power from an associated locking device when a power level of the sensor reaches a threshold level.

11. The security system of claim 1, wherein:

the plurality of locking devices may be selectively manipulated between the locked configuration and unlocked configuration simultaneously.

12. A method of providing access control using a security system configured to operate in association with a facility, wherein the facility includes a plurality of rooms with corresponding doors providing access thereto, the security system having a plurality of locking devices linked to a communications network, each locking device configured to selectively restrict movement of one of the corresponding doors, each locking device including an actuator and a controller associated therewith, the method comprising:

via a sensor, detecting an object or event associated with a threat event, wherein the threat event is independent of user credential input and generating an output signal representing the detected threat event;

via the controller associated each locking device, receiving the output signal from the sensor and processing the received output signal to determine an actuator command;

providing the actuator command to an actuator of the locking device;

automatically actuating the corresponding lock actuator in response to the detected threat event;

producing an actuator output based on the actuator command, wherein the actuator output manipulates the locking device between a locked configuration and an unlocked configuration, and in the locked configuration the locking device resists movement of a door; and propagating a control signal across the communications network to cause other controllers to actuate respective lock actuators in coordination, thereby initiating a lockdown of the facility and the plurality of rooms in real time.

13. The method of claim 12, wherein:

the sensor includes a light detection and ranging (LIDAR) sensor configured to detect at least the position of an object.

14. The method of claim 13, further comprising:

in response to at least the output signal from the sensor, generating a user interface including a three-dimensional map of an interior of the facility of at least the detected object.

15. The method of claim 12, wherein:

the sensor includes a camera configured to detect an image field.

16. The method of claim 15, further comprising:

in response to at least the output signal from the sensor, generating a user interface including a three-dimensional map of an interior of the facility of at least the detected image field.

17. The method of claim 12, further comprising:

wherein the sensor includes a motion sensor configured to detect at least motion within a motion sensor field of view; and via the controller, manipulating the locking device into the unlocked configuration at least when the motion sensor detects motion.

18. The method of claim 17, further comprising:

manipulating the locking device into the unlocked configuration at least when the motion sensor detects a user actuating a door handle, wherein the motion sensor is mounted adjacent to the door handle, the door handle operable to selectively unnest the door from a door frame.

19. The method of claim 12, further comprising:

generating an alert at least in response to the sensor detecting an event.

20. The security system of claim 1, wherein the plurality of local controllers are configured to enter a lockdown mode upon detection of the threat event, the lockdown mode comprising simultaneously locking a plurality of locking devices without requiring authentication of a user credential.

21. The security system of claim 1, wherein the one or more of the sensors include at least one of: a motion detector, acoustic detector, gunshot detector, glass-break sensor, or intrusion alarm sensor, and wherein the system is configured to autonomously trigger a coordinated lockdown in response to detection of an associated threat condition.

22. The security system of claim 20, wherein each local controller is configured to automatically enter the lockdown mode in response to loss of communication with the communication network.

23. The security system of claim 1, wherein each local controller is configured to initiate actuation of the lock actuator based on sensor signals received from a plurality of different sensor types, the plurality including at least one intrusion detection sensor and at least one environmental sensor.

24. The security system of claim 1, wherein the plurality of local controllers are grouped into zones, and wherein a first local controller detecting the threat event is configured to propagate a lockdown signal to other local controllers within its zone and to at least one controller in a different zone.

25. The security system of claim 1, wherein the local controllers are configured to implement a priority-based lockdown sequence in which selected locking devices are actuated before other locking devices based on predefined security rules.

26. The security system of claim 1, wherein at least one of the local controllers is further configured to transmit a lockdown notification to an external monitoring system or emergency response system upon detection of the threat event.

27. The security system of claim 1, wherein each local controller includes a backup power source configured to actuate the corresponding lock actuator in the event of primary power failure.

28. The security system of claim 20, wherein the local controllers are configured to verify the threat event by requiring confirmation from two or more distinct sensors prior to initiating the lockdown mode.

\* \* \* \* \*